US012739814B2

(12) United States Patent
Abedini et al.

(10) Patent No.: US 12,739,814 B2
(45) Date of Patent: Sep. 15, 2026

(54) TECHNIQUES FOR PROVIDING INFORMATION ASSOCIATED WITH A POWER SPECTRAL DENSITY

(71) Applicant: QUALCOMM Incorporated, San Diego, CA (US)

(72) Inventors: Navid Abedini, Basking Ridge, NJ (US); Jianghong Luo, Skillman, NJ (US); Luca Blessent, Whitehouse Station, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 910 days.

(21) Appl. No.: 17/931,357

(22) Filed: Sep. 12, 2022

(65) Prior Publication Data

US 2023/0094729 A1 Mar. 30, 2023

Related U.S. Application Data

(60) Provisional application No. 63/262,003, filed on Oct. 1, 2021, provisional application No. 63/261,789, filed on Sep. 29, 2021.

(51) Int. Cl.
*H04W 72/044* (2023.01)

(52) U.S. Cl.
CPC ................................ *H04W 72/0473* (2013.01)

(58) Field of Classification Search
CPC ............. H04W 52/225; H04W 52/367; H04W 72/0473
See application file for complete search history.

(56) References Cited

U.S. PATENT DOCUMENTS

| | | | | |
|---|---|---|---|---|
| 2020/0229104 | A1* | 7/2020 | MolavianJazi | H04W 52/54 |
| 2021/0266847 | A1* | 8/2021 | Cariou | H04W 52/52 |
| 2023/0043655 | A1* | 2/2023 | Hedayat | H04W 52/34 |
| 2023/0046730 | A1* | 2/2023 | Peng | H04W 56/0045 |

FOREIGN PATENT DOCUMENTS

| | | | | |
|---|---|---|---|---|
| CN | 110537332 A | * | 12/2019 | H04L 5/0053 |
| CN | 114745769 A | * | 7/2022 | H04W 52/146 |

OTHER PUBLICATIONS

NPL.*
International Search Report and Written Opinion—PCT/US2022/076322—ISA/EPO—Dec. 15, 2022.

* cited by examiner

*Primary Examiner* — Sulaiman Nooristany
(74) *Attorney, Agent, or Firm* — Harrity & Harrity LLP/QUALCOMM Incorporated

(57) ABSTRACT

Various aspects of the present disclosure generally relate to wireless communication. In some aspects, a first wireless communication device (WCD) may transmit, to a second WCD, information associated with a power spectral density (PSD), the information including a PSD range that may be used to transmit a communication. The WCD may transmit, to the second WCD, the communication based at least in part on the transmission of the information. Numerous other aspects are described.

30 Claims, 9 Drawing Sheets

600

TECHNIQUES FOR PROVIDING INFORMATION ASSOCIATED WITH A POWER SPECTRAL DENSITY

CROSS-REFERENCE TO RELATED APPLICATIONS

This Patent Application claims priority to U.S. Provisional Patent Application No. 63/261,789, filed on Sep. 29, 2021, entitled "TECHNIQUES FOR PROVIDING INFORMATION ASSOCIATED WITH A POWER SPECTRAL DENSITY," and assigned to the assignee hereof. This Patent Application also claims priority to U.S. Provisional Patent Application No. 63/262,003, filed on Oct. 1, 2021, entitled "TECHNIQUES FOR PROVIDING INFORMATION ASSOCIATED WITH A POWER SPECTRAL DENSITY," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for providing information associated with a power spectral density.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first wireless communication device (WCD). The method may include transmitting, to a second WCD, information associated with a power spectral density (PSD), the information being based at least in part on one or more parameters. The method may include transmitting, to the second WCD, a communication based at least in part on the transmission of the information.

Some aspects described herein relate to a method of wireless communication performed by a first WCD. The method may include receiving, from a second WCD, information associated with a PSD, the information being based at least in part on one or more parameters. The method may include receiving, from the second WCD, a communication based at least in part on the information.

Some aspects described herein relate to a first WCD for wireless communication. The first WCD may include a memory and one or more processors coupled to the memory. The one or more processors may be configured to transmit, to a second WCD, information associated with a PSD, the information being based at least in part on one or more parameters. The one or more processors may be configured to transmit, to the second WCD, a communication based at least in part on the transmission of the information.

Some aspects described herein relate to a first WCD for wireless communication. The first WCD may include a memory and one or more processors coupled to the memory. The one or more processors may be configured to receive, from a second WCD, information associated with a PSD, the information being based at least in part on one or more parameters. The one or more processors may be configured to receive, from the second WCD, a communication based at least in part on the information.

Some aspects described herein relate to a non-transitory computer-readable medium that stores a set of instructions for wireless communication by a first WCD. The set of instructions, when executed by one or more processors of the WCD, may cause the WCD to transmit, to a second WCD, information associated with a PSD, the information being based at least in part on one or more parameters. The set of instructions, when executed by one or more processors of the WCD, may cause the WCD to transmit, to the second WCD, a communication based at least in part on the transmission of the information.

Some aspects described herein relate to a non-transitory computer-readable medium that stores a set of instructions for wireless communication by a WCD. The set of instructions, when executed by one or more processors of the WCD, may cause the WCD to receive, from a second WCD, information associated with a PSD, the information being based at least in part on one or more parameters. The set of instructions, when executed by one or more processors of the WCD, may cause the WCD to receive, from the second WCD, a communication based at least in part on the information.

Some aspects described herein relate to an apparatus for wireless communication. The apparatus may include means for transmitting, to a WCD, information associated with a PSD, the information being based at least in part on one or more parameters. The apparatus may include means for transmitting, to the WCD, a communication based at least in part on the transmission of the information.

Some aspects described herein relate to an apparatus for wireless communication. The apparatus may include means for receiving, from a WCD, information associated with a PSD, the information being based at least in part on one or more parameters. The apparatus may include means for receiving, from the WCD, a communication based at least in part on the information.

Aspects generally include a method, apparatus, system, computer program product, non-transitory computer-readable medium, user equipment, base station, WCD, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
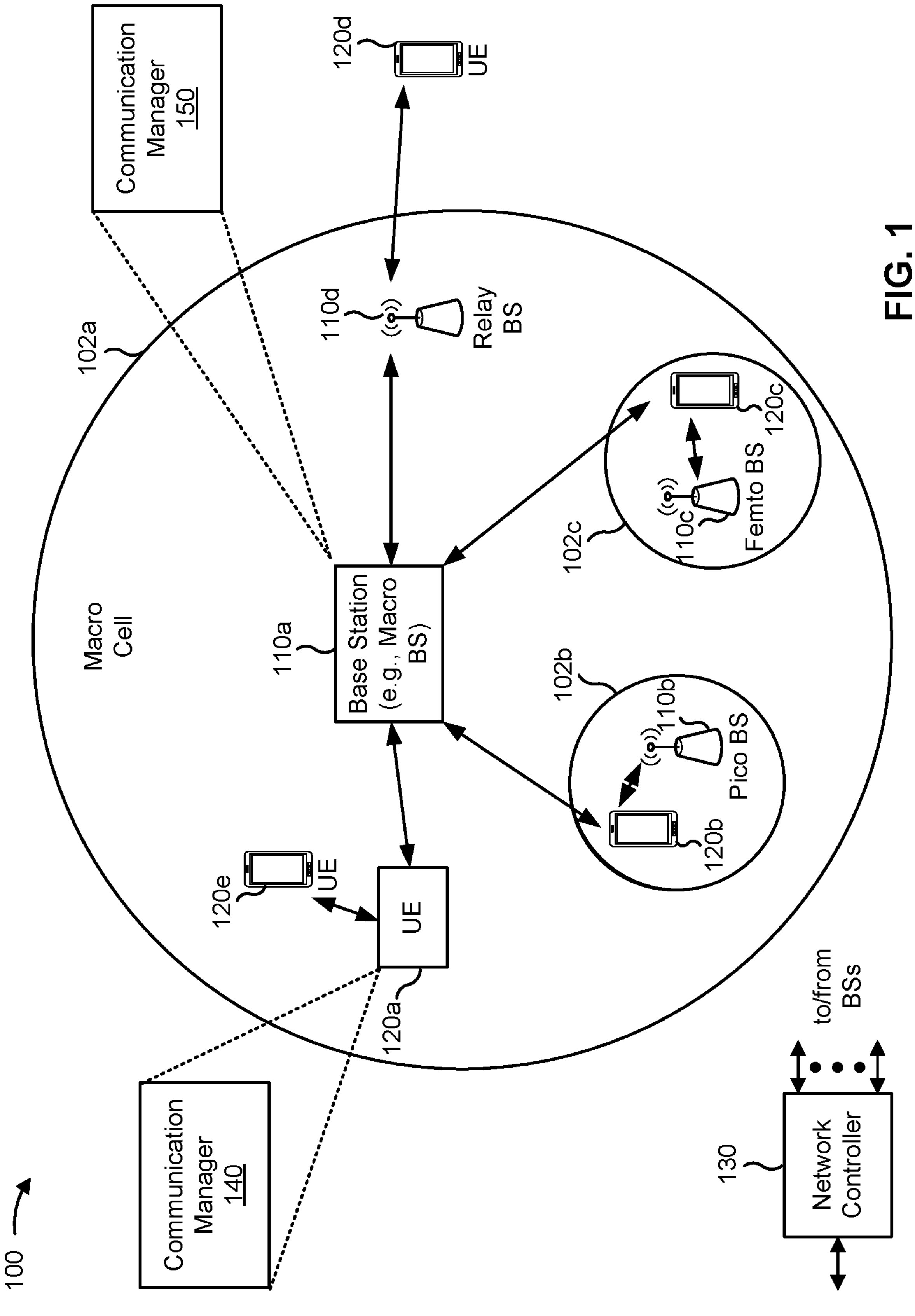
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first WCD (e.g., as a UE or a mobile terminal (MT), among other examples) may include a communication manager 140 or 150. As described in more detail elsewhere herein, the communication manager 140 or 150 may transmit, to a second WCD, information associated with a PSD, the information being based at least in part on one or more parameters; and transmit, to the second WCD, a communication based at least in part on the transmission of the information. Additionally, or alternatively, the communication manager 140 or 150 may perform one or more other operations described herein.

In some aspects, a first WCD (e.g., as a base station, a distributed unit (DU), or a centralized unit (CU), among other examples) may include a communication manager 150. As described in more detail elsewhere herein, the communication manager 150 may receive, from a second WCD, information associated with a PSD, the information being based at least in part on one or more parameters; and receive, from the second WCD, a communication based at least in part on the information. Additionally, or alternatively, the communication manager 150 may perform one or more other operations described herein.

As indicated above, FIG. 1 is provided as an example. Other examples may differ from what is described with regard to FIG. 1.

Figure 2:
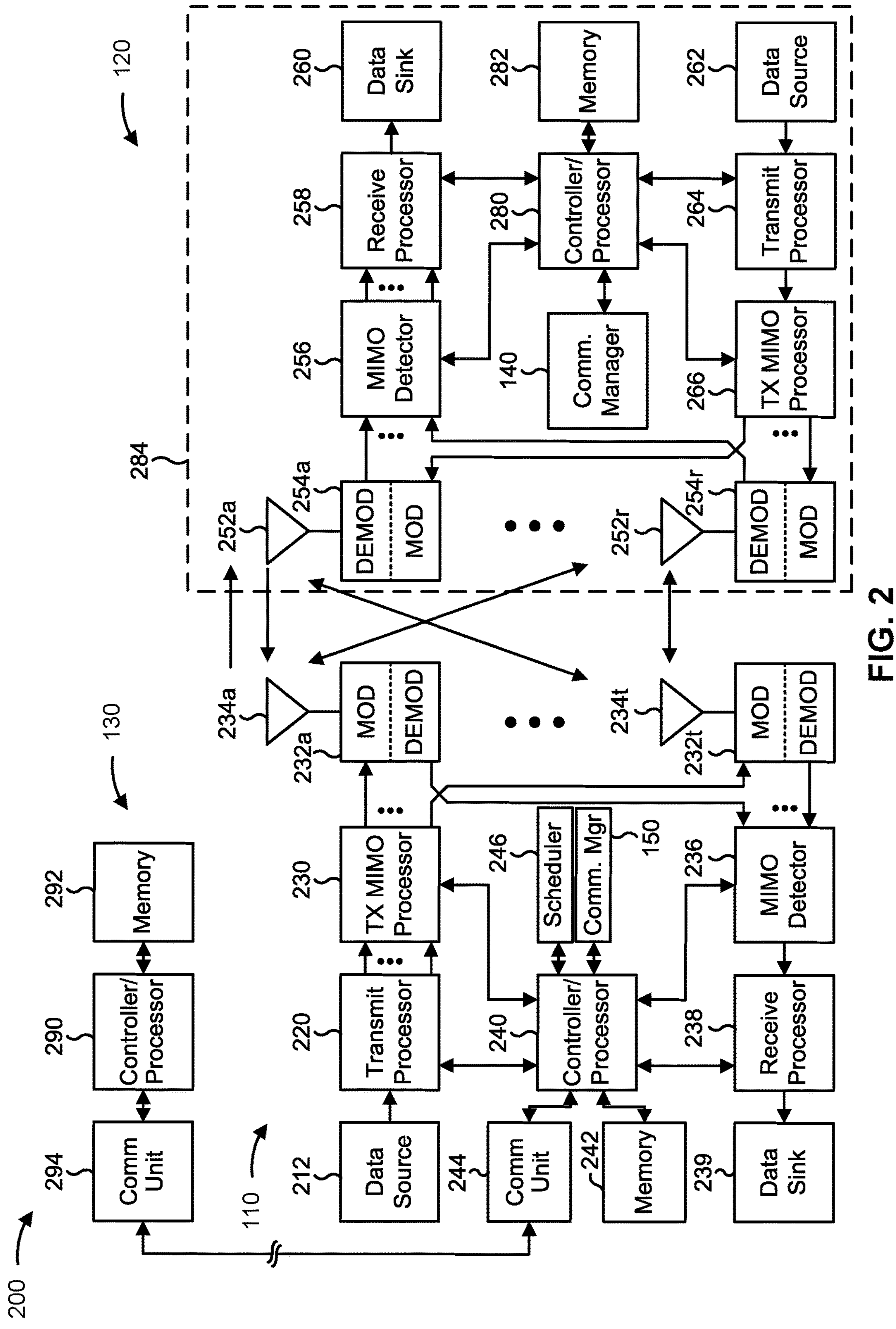
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with providing information associated with a power spectral density (PSD), as described in more detail elsewhere herein. In some aspects, a first WCD or a second WCD described herein is the base station 110, is included in the base station 110, or includes one or more components of the base station 110 shown in FIG. 2. In some aspects, a first WCD or a second WCD described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a first WCD includes means for transmitting, to a second WCD, information associated with a PSD, the information being based at least in part on one or more parameters; and/or means for transmitting, to the second WCD, a communication based at least in part on the transmission of the information. In some aspects, the means for the first WCD to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first WCD to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first WCD includes means for receiving, from a second WCD, information associated with a PSD, the information being based at least in part on one or more parameters; and/or means for receiving, from the second WCD, a communication based at least in part on the information. In some aspects, the means for the first WCD to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first WCD to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor

258, and/or the TX MIMO processor 266 may be performed by or under the control of the controller/processor 280.

As indicated above, FIG. 2 is provided as an example. Other examples may differ from what is described with regard to FIG. 2.

Figure 3:
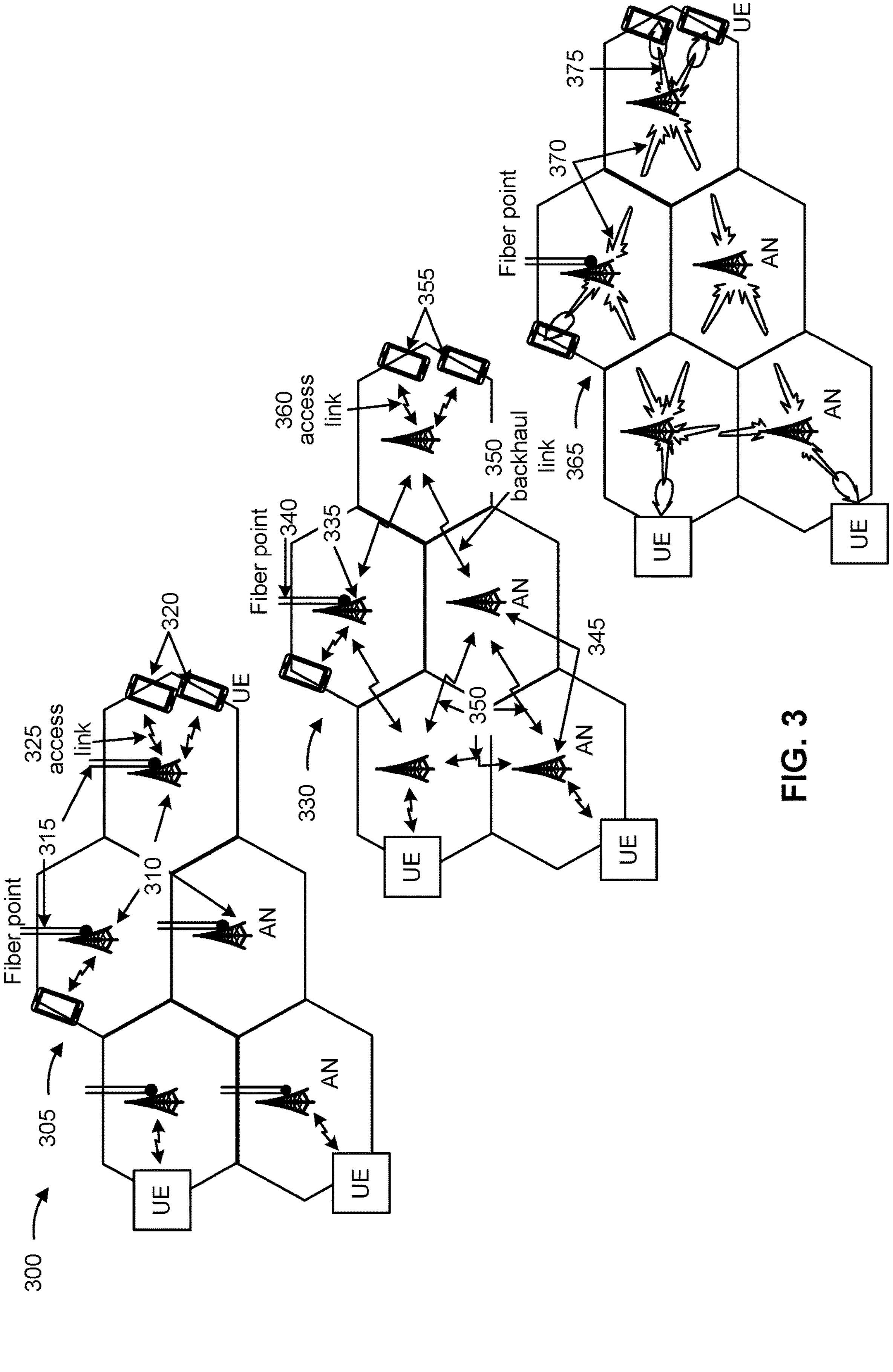
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (ANs)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
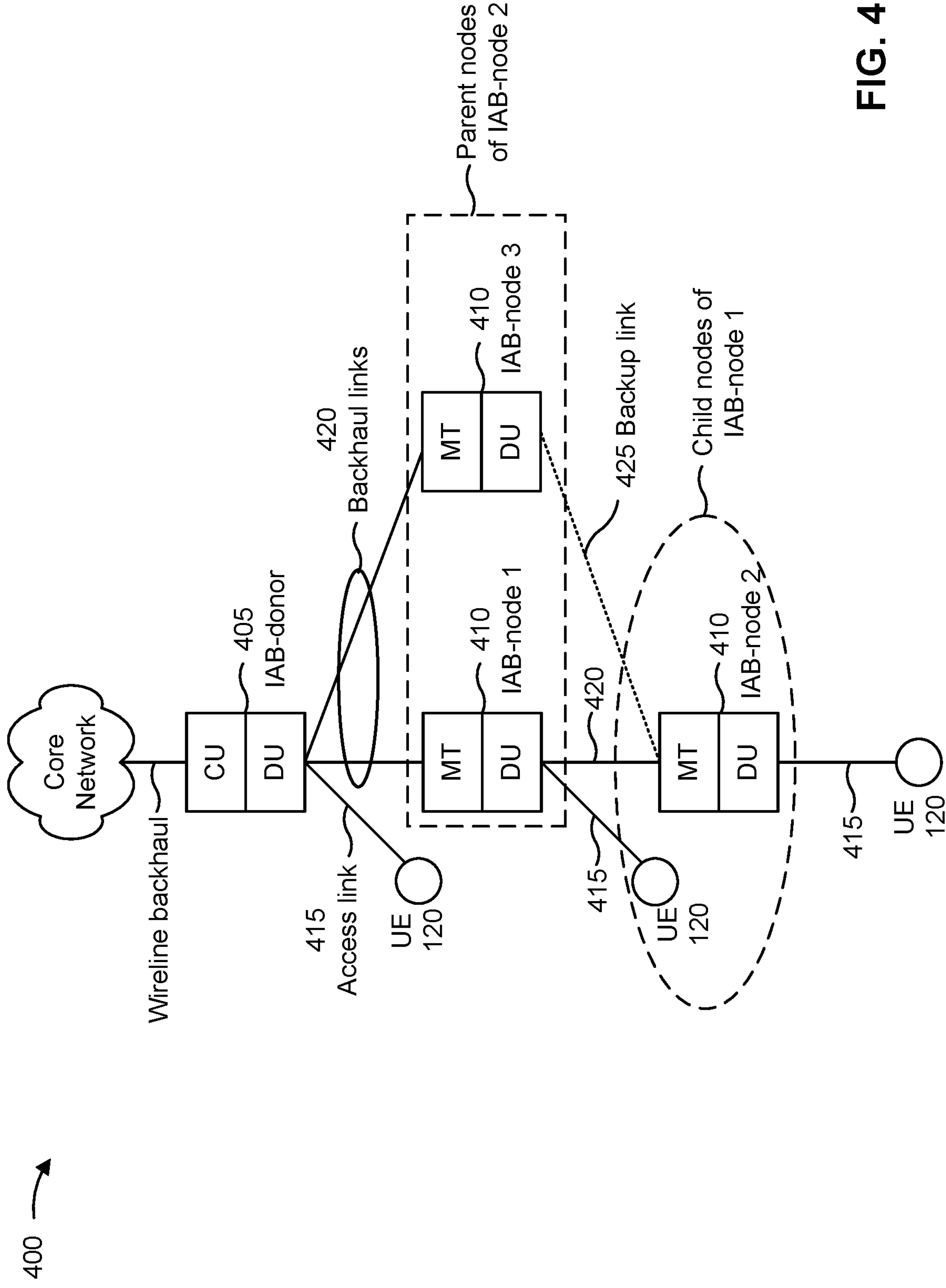
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a CU, which may perform access node controller (ANC) functions and/or AMF functions. The CU may configure a DU of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

In some networks, a first WCD (e.g., a UE, an MT, and/or a child node, among other examples) may be configured to provide an indication of a PSD to a second WCD (e.g., a base station, a DU, a parent node, and/or another UE (e.g., in a sidelink connection)). The indication of the PSD may indicate a desired, requested, and/or preferred PSD for a communication from the first WCD to the second WCD. The second WCD may transmit an indication of a configuration, including a PSD, for the first WCD to use for the communication. The PSD may indicate a total amount of power per frequency-domain unit (e.g., power per subcarrier, power per resource block, or power per sub-band, among other examples). The indication of the PSD may indicate a range of PSDs (e.g., a lower limit and an upper limit of a requested range of PSDs).

In some use-cases, the indication of the PSD may be insufficient to properly manage configurations for the first WCD to use for the communication. For example, in a spatial division multiplexing (SDM) transmission use case where the first WCD transmits (e.g., uplink, downlink, and/or sidelink) using a first link and transmits using a second link (e.g., uplink, downlink, and/or sidelink) simultaneously, the indication of the PSD may be insufficient to avoid a power imbalance between a first transmission via the first link and a second transmission via the second link. For example, if the first transmission (e.g., using an MT of the first WCD) and the second transmission (e.g., using a DU of the first WCD) use a same antenna group and/or power amplifiers, the indication of the PSD may be insufficient to avoid a power imbalance. The power imbalance may cause clipping and/or transmission via one of the links, with a transmission power of the one of the links being lower than a noise floor. Additionally, or alternatively, the indication of the PSD may be insufficient to avoid configuring, for the first transmission, the first WCD with a disproportionate amount of a total transmission power (e.g., a total transmission power limit) allowed for the first WCD. In this way, a remaining amount of the total transmission power allowed for the second transmission may be insufficient for reception by a receiving device associated with the second transmission (e.g., an additional WCD or the second WCD).

Based at least in part on the transmission power allowed for the second transmission being lower than the noise floor and/or being insufficient for reception by the receiving device associated with the second transmission, the first WCD and/or the receiving device may consume computing, communication, network, and/or power resources based at least in part on the receiving device failing to receive the second transmission.

In some use cases, where the first WCD transmits a first communication (e.g., uplink, downlink, and/or sidelink) using a first link and simultaneously receives a second communication using a second link (e.g., uplink, downlink, and/or sidelink), the indication of the PSD may be insufficient to avoid self-interference (e.g., enough self-interference to cause communication errors) between transmission of the first communication and reception of the second communication. For example, a radio bearer allocation and/or a resource block allocation may be needed to determine an amount of self-interference that will be caused by the first communication onto the second communication. If the first link and the second link have fully overlapped allocations, the PSD may be sufficient. However, if the allocations are partially overlapped, an impact of self-interference may be based at least in part on a PSD and a number of overlapped resource elements. Additionally, or alternatively, if the allocations have no overlap, parameters of a guard band and the PSD may indicate an impact of self-interference based at least in part on self-interference leakage from a first allocation for the first link to a second allocation for the second link. The self-interference leakage may be further based at least in part on a number of occupied resource elements.

Based at least in part on a failure to avoid self-interference, self-interference from the first link may cause communication errors for the second link. Additionally, or alternatively, based at least in part on an assumption of fully overlapped allocations, a transmission power of the first communication may be unnecessarily limited, which may cause the first WCD to transmit the first communication with insufficient power for reception by the second WCD. In this way, the first WCD, the second WCD, and/or a transmitting device associated with the second link may consume computing, communication, network, and/or power resources based at least in part on the second WCD failing to receive the first communication and/or based at least in part on the first WCD failing to receive the second communication.

In some aspects described herein, a first WCD (e.g., a child node, an IAB node (e.g., an MT), and/or a UE, among other examples) may transmit, to a second WCD (e.g., a parent node, an IAB node (e.g., a DU), a base station, and/or a UE, among other examples) information associated with a PSD, with the information being based at least in part on one or more parameters. For example, the first WCD may transmit an indication of a PSD and/or a range of PSDs for the second WCD to use to configure the first WCD with one or more transmission parameters. The first WCD may use the one or more parameters in a determination and/or calculation of the PSD. For example, the one or more parameters may include a transmission bandwidth (e.g., a reference transmission bandwidth and/or an assumed transmission bandwidth, among other examples), a guard band (e.g., a reference guard band and/or an assumed guard band, among other examples), and/or a resource block allocation (e.g., a reference resource block allocation, an assumed resource block allocation, among other examples), among other examples.

The second WCD may indicate the one or more parameters via an explicit indication and/or an implicit indication. In some aspects, the transmission bandwidth used to determine and/or calculate the PSD may be based at least in part on a maximum transmission bandwidth. The maximum transmission bandwidth may be based at least in part on any of an uplink bandwidth part configuration for the first WCD, a bandwidth of the second WCD, a frequency-domain resource configuration of a cell of the second WCD, and/or explicitly indicated available soft resources in the frequency domain (e.g., as indicated via a downlink control information (DCI) message 2_5), among other examples. For example the frequency-domain resource configuration may indicate hard resources (e.g., resources available for the first WCD to communicate with child-nodes), soft resources (e.g., resources that are conditionally available for first WCD to communicate with child-nodes), or not available resources (e.g., resources that are not available for the first WCD to communicate with child-nodes (e.g., the first WCD is to abstain from using the resources except in some special cases)).

In some aspects, the first WCD may determine and/or calculate the guard band and/or resource block allocation based at least in part on any of an uplink bandwidth part configuration for the first WCD, a bandwidth of the second WCD, a frequency-domain resource configuration of a cell of the second WCD, and/or explicitly indicated available soft resources in the frequency domain (e.g., as indicated via a DCI message 2_5), among other examples.

In some aspects, the one or more parameters may be associated with a configuration of a previous communication. For example, the first WCD may determine the one or more parameters based at least in part on a previous communication via the first link (such as, for example, a communication that includes the information).

In some aspects, the one or more parameters may be updated (e.g., changed) based at least in part on an updated configuration. For example, the second WCD may transmit an indication to update a configuration for a subsequent communication. In some aspects, the first WCD may transmit updated information based at least in part on the updated one or more parameters. In some aspects, the second WCD may adjust a transmission power (e.g., in an uplink transmission and/or a communication via the first link, among other examples) based at least in part on the information previously provided by the first WCD. For example, the second WCD may adjust the transmission power, from a transmission power configured based at least in part on the information previously reported, based at least in part on a difference between the one or more parameters and the one or more updated parameters.

In some aspects, the information may include a first portion associated with a first multiplexing mode, such as a mode in which the first WCD transmits via a first link (e.g., an MT link) and via a second link (e.g., a DU link) simultaneously and/or a mode in which the first WCD transmits via the first link (e.g., the MT link) and receives via the second link (e.g., the DU link) simultaneously. In some aspects, for the mode in which the first WCD transmits via the first link and receives via the second link simultaneously, the information may indicate only an upper-bound of a range of PSD (e.g., with an assumption that a lower-bound range of PSD is zero or negative infinity, among other examples). In some aspects, the information is associated with a full duplex mode of the first WCD in which the first WCD simultaneously transmits and receives communications with the second WCD. The information may indicate an PSD to use for configuring the transmission parameters for the full duplex mode. In some aspects, the information is associated with a dual connectivity mode and/or a carrier aggregation mode of the first WCD, in which the first WCD simultaneously transmits via a first carrier and/or cell and receives communications from the second WCD via a second carrier and/or cell. The information may indicate an PSD to use for configuring the transmission parameters for one or more multiplexing modes, such as a first mode in which the first WCD simultaneously transmits via a first carrier and/or cell and transmits via a second carrier and/or cell, a second mode in which the first WCD simultaneously transmits via the first carrier and/or cell and receives via the second carrier and/or cell, and/or a third mode in which the first WCD simultaneously receives via the first carrier and/or cell and transmits via the second carrier and/or cell, among other examples.

In some aspects, the information may include different portions associated with different beams. For example, the information may include different portions associated with different uplink beams and/or different portions associated with different downlink beams, among other examples. In some aspects, for a mode in which the first WCD transmits via a first link (e.g., an uplink in a full duplex mode and/or an MT link, among other examples) and transmits in a second link (e.g., a downlink in a full duplex mode and/or a DU link, among other examples), for some combinations of first link beams and second link beams no limitations may be necessary. For example, limitations may be unnecessary based at least in part on a first link beam being associated with a different antenna group than a second link beam.

In some aspects, for a multiplexing mode in which the first WCD transmits via the first link and receives via the second link (e.g., an MT-transmission & DU-reception mode), for different combinations of transmission beams (e.g., MT-transmission beams) and reception beams (e.g., DU-RX beams), the first WCD may have different limitations. For example, the different limitations may be based at least in part on a level of self-interference that depends on an amount of spatial isolation between different transmission beams and reception beams.

In some aspects, the information may include different portions associated with different component carriers (e.g., UE component carriers and/or MT component carriers, among other examples). For example, the information may include multiple indications (e.g., indications of PSD) provided to a first cell (e.g., a primary cell) and may be associated with different component carriers. Additionally, or alternatively, the information may include different portions transmitted via different component carriers, with each portion corresponding to a component carrier on which the portion is transmitted. Additionally, or alternatively, the information may include a single communication transmitted via a single component carrier (e.g., a primary cell) and may be associated with a set of component carriers (e.g., of a UE or an MT, among other examples), with the set of component carriers including all component carriers or a subset of the component carriers.

In some aspects, the information may include different portions for different channels and/or signal types. For example, the information may include a first portion associated with sounding reference signals (SRSs), a second portion associated with a physical uplink control channel (PUCCH), a third portion associated with a physical uplink shared channel (PUSCH), and/or a fourth portion associated with a configured grant PUSCH, among other examples.

In some aspects, the second WCD may not adjust a transmission power for a communication from the first WCD to the second WCD (e.g., via the first link) based at least in part on the information (e.g., within a range of PSD indicated in the information). In some aspects, the first WCD may need to autonomously adjust a transmission power and may adjust the transmission power based at least in part on the information (e.g., using an PSD within the range of PSD indicated in the information). In some aspects, the second WCD may use the information in configuring reception processing, beam management, link management, and/or link adaptation, among other examples. In some aspects, the first WCD may need to autonomously adjust the transmission power based at least in part on a concurrent communication having a higher priority than the communication from the first WCD to the second WCD and/or a requirement for the first WCD to limit a minimum or maximum transmission power, among other examples.

In some aspects, the first WCD may adjust a transmission power via the first link based at least in part on a collision and/or a conflict (e.g., partially or fully, in time and/or frequency) with a higher priority communication (e.g., in an enhanced duplexing mode, in a carrier aggregation mode, and/or in a dual connectivity mode, among other examples). In some aspects, the first WCD may adjust (e.g., autonomously) the transmission power based at least in part on an indicated desired range.

A total transmission power may be relevant to address concerns about power imbalance and/or power sharing, while the PSD along with a resource block allocation may be more relevant to address concerns about interference (e.g., self-interference and/or cross-link interference). In some aspects, both concerns may be valid and the first WCD (e.g., an MT) may provide two indications, such as a desired PSD range 1 along with a reference bandwidth and a desired PSD range 2 along with a reference resource block allocation. In some aspects, the first WCD may indicate a single PSD range, in which an upper limit is configured to address a first concern (e.g., interference), and a lower limit is configured to address another concern (e.g., power imbalance). The second WCD may use the lower limit and the upper limit with different configurations. For example, the second WCD may use the lower limit for a reference transmission bandwidth and may use the upper limit for a reference resource block allocation.

In examples where the first WCD is an IAB node or a UE, an indicated (e.g., desired and/or requested) IAB-MT or UE UL TX power (e.g., a PSD range) may depend on, and/or be associated with, any combination of the following configurations: a component carrier of the IAB-MT or UE, an IAB-DU cell, a transmission beam (e.g., a transmission configuration indicator (TCI) state, scheduling request indicator (SRI), and/or quasi-co-location information, among other examples) of the IAB-MT or UE, a multiplexing mode of the IAB-node or UE, whether an uplink signal is frequency division multiplexed with one or more concurrent communications (e.g., a downlink signal or a sidelink signal of the IAB-DU, IAB-MT, or UE) or whether the uplink signal and the one or more other concurrent communications overlap at least partially in the frequency domain, among other examples. Additionally, or alternatively, the configurations may include any combination of a bandwidth of the uplink signal, a resource block allocation of the uplink signal, and/or a timing reference mode associated with at least one concurrent communication, among other examples. Additionally, or alternatively, the indicated desired IAB-MT's (or UE's) uplink TX power (e.g., PSD range) may be associated with a set of explicitly indicated time resources. The IAB or UE may provide the set of explicitly indicated time resources and/or receive an indication of a dependence or association with the configurations, via medium access control (MAC) signaling (e.g., one or more MAC control elements (CEs)).

Another related aspect is an uplink timing reference to be used by the IAB-MT (or UE) to send its uplink signals. To facilitate enhanced multiplexing modes (e.g., to support concurrent communications) at the IAB-node, the UE and/or a parent-node, adjustment of the uplink timing reference may be desired. For example, in cases where the first device is an IAB, to support concurrent transmission by the IAB-MT and transmission and/or reception by the IAB-DU, the IAB-node may desire to adjust its IAB-MT uplink timing reference to be aligned with its IAB-DU timing reference. In some aspects, the IAB-MT uplink transmission timing may be desired to be aligned with the IAB-DU downlink transmission timing. This may be referred to as Case 6 timing in the context of the IAB.

While a parent-node that controls the uplink timing of the IAB-MT or UE, the IAB-MT or UE may indicate its desired timing adjustment (or timing case) to the parent-node. An indication of the desired UL timing adjustment (e.g., whether Case 6 timing is needed, requested, and/or desired by the IAB-MT) may depend on, or may be associated with, any combination of the following configurations: a component carrier of the IAB-MT or UE, the IAB-DU cell, the multiplexing mode of IAB-node (or UE), the transmission beam (e.g., TCI state, SRI, and/or quasi-co-location information, among other examples) of the IAB-MT or UE, whether an uplink signal (e.g., from the IAB-MT or UE) is frequency division multiplexed with one or more concurrent communications (e.g., a downlink signal or a sidelink signal of the IAB-DU, IAB-MT, or UE) or whether the uplink signal and the one or more other concurrent communications overlap at least partially in the frequency domain, among other examples. Alternatively, or additionally, the indication of the desired UL timing adjustment (or timing case) may be associated with an explicitly indicated set of time resources.

The parent-node (e.g., a parent IAB, a base station, and/or a DU) may also indicate or enable one or more different UL timing references to the IAB-MT or UE to facilitate enhanced multiplexing modes. For example, in a case where the first device is an IAB node and in addition to Case 6 timing, to support concurrent reception by an MT of the and/or DU of the parent-node, the parent-node may desire to align its uplink reception timing (e.g., from the IAB-MT or the UE) and its downlink reception timing from its own parent-node. For this, the parent-node may need to further adjust the uplink transmission timing of the IAB-MT or UE. For example, the parent-node may adjust the uplink transmission timing of the IAB-MT or UE using an indication of an additional offset to be applied along with a baseline (may also be referred to Case 1) uplink transmission timing. This may be referred to as Case 7 timing in the context of IAB.

The parent-node may provide a timing case indication that indicates (e.g., explicitly) a list of time resources (e.g., slots or symbols) and associated uplink transmission timing cases (e.g., one of the {Case 1, Case 6, Case 7} for each time resource). The parent-node may provide the indication via MAC-CE. Additionally, or alternatively, (e.g., at least for Case 1 and Case 6 timings) the indication of the timing case may be associated with any combination of the following configurations: a component carrier of the IAB-MT or UE, an IAB-DU cell, the transmission beam (e.g., TCI state, SRI, and/or quasi-co-location information, among other examples) of the IAB-MT or UE, whether an uplink signal (e.g., from the IAB-MT or UE) is frequency division multiplexed with one or more concurrent communications (e.g., a downlink signal or a sidelink signal of the IAB-DU, IAB-MT, or UE) or whether the uplink signal and the one or more other concurrent communications overlap at least partially in the frequency domain, a bandwidth of the uplink signal, and/or a resource block allocation of the UL signal.

Another related aspect is an indication of one or more recommended and/or not-preferred beams for the IAB-MT or UE, provided by the IAB-MT or UE to the parent-node. Like the above examples (e.g., the indication of desired timing case, or UL TX power), this indication can be provided for a set of explicitly indicated time resources, or may be associated with, and/or indicated for, a combination of various configurations such as the component carrier of the IAB-MT or UE, the IAB-DU cell, the multiplexing mode of IAB-node (or UE), the transmission beam (e.g., TCI state, SRI, and/or quasi-co-location information, among other examples) of the IAB-MT or UE, whether an uplink signal (e.g., from the IAB-MT or UE) is frequency division multiplexed with one or more concurrent communications (e.g., a downlink signal or a sidelink signal of the IAB-DU, IAB-MT, or UE) or whether the uplink signal and the one or more other concurrent communications overlap at least partially in the frequency domain, a bandwidth of the signal, and/or a resource block allocation of the signal, among other examples. The indication of the recommended and/or not-preferred beams may be for one or more of an uplink transmission beam or a downlink reception beam. This indication may be provided via MAC-CE.

In some aspects, the parent-node (e.g., a base station and/or DU) may indicate to the IAB-MT or UE whether it grants the request (e.g., of the recommended and/or not-preferred beams) received from the IAB-MT or UE. In some examples, the parent-node indicates the applicable and/or restricted beams of the IAB-MT or UE for upcoming resources (e.g., based at least in part on an indication of the recommended and/or not-preferred beams). This indication may be associated with a set of explicitly indicated time and/or frequency resources. Additionally, or alternatively, this indication may be associated with a combination of different configurations. As described herein.

Additionally, or alternatively, the parent-node may indicate the recommended, not-preferred, and/or restricted beams of the IAB-DU or UE that IAB-DU or UE is to consider when it communicates with its own connected UEs or child IAB-nodes. The indication may be associated with a set of explicitly indicated time and/or frequency resources. The indication can be associated with a combination of various configurations (e.g., of the IAB-MT, IAB-DU, and/or the parent-node) such as, the IAB-DU cell, the IAB-MT component carriers, the multiplexing modes, the resource block allocation, the bandwidth, beam directions, the timing cases, resource types, and/or types of signals or channels, among other examples. The indication from the parent-node (e.g., even for the restricted beams) may not always be granted by the IAB-node. The IAB-node may provide to the parent-node information about the configuration (or reconfiguration) of the IAB-node in response to the indication from the parent-node.

Another related aspect is the indication of a desired guard band and/or whether frequency division multiplexing is required between the concurrent communications. This indication may be sent by the IAB-node or UE to the parent node and/or to the CU. An amount of guard band, in terms of a number of resource blocks, may be provided. Alternatively, the IAB-node or UE may indicate its desire to the parent-node, base station and/or CU that one or a few groups of resource blocks should not be used for its uplink and/or downlink communications. The indication of desired guard band and/or whether frequency division multiplexing (FDM) is required may be associated with a set of explicitly indicated time resources and/or a combination of different configurations as those discussed above. The indication may be for uplink transmission and/or downlink reception. This indication may be provided via MAC-CE.

On the other hand, the parent-node (e.g., gNB or DU) may indicate to the IAB-MT or UE whether it grants the request (e.g., of the desired guard band and/or whether FDM is required) received from the IAB-MT or UE. In some examples, the parent-node indicates the amount of provided guard band for upcoming resources. The indication may be associated with a set of explicitly indicated time and/or frequency resources. Alternatively, or additionally, the indication may be associated with a combination of different configurations as those discussed above. In another example, the parent-node may indicate to the IAB-node (e.g., via sending a downlink signal to IAB-MT) the recommended guard-band, whether FDM is required, and/or restricted groups of resources blocks (RBs) to be used by the UE or IAB-DU to communicate with its own UEs, or child IAB-nodes.

Like the above aspects, some guard symbols may be desired and/or provided when there is a switch between different timing cases, different multiplexing modes, or any combination thereof. The indication of desired guard symbols may be provided by the IAB-node (e.g., the IAB-MT) or UE to the parent-node, or by the parent-node to the IAB-node or UE. The indication of provided guard symbols may be provided by the IAB-node (e.g., IAB-MT) or UE to the parent-node, or by the parent-node to the IAB-node or UE. The indications may be associated with a set of explicitly indicated time resources, or different combination of related configuration as those discussed above.

Based at least in part on the first WCD providing information that is based at least in part on the one or more parameters, the second WCD may determine transmission parameters for the first WCD to use for a communication. The information may include an indication of PSD that is based at least in part on the one or more parameters, and the second WCD may determine one or more additional parameters (e.g., a total power limit) based at least in part on the indication of the PSD and knowledge of the one or more parameters used to determine and/or calculate the PSD. In this way, the base station may be able to reduce self-interference and/or may be able to avoid causing a transmission power for a second transmission to be reduced to below a noise floor or to be insufficient for a receiving device to receive a communication via the second transmission. This may conserve computing, communication, network, and/or power resources based at least in part on reducing communication errors and/or reducing detection and/or correction of the communication errors.

Figure 5:
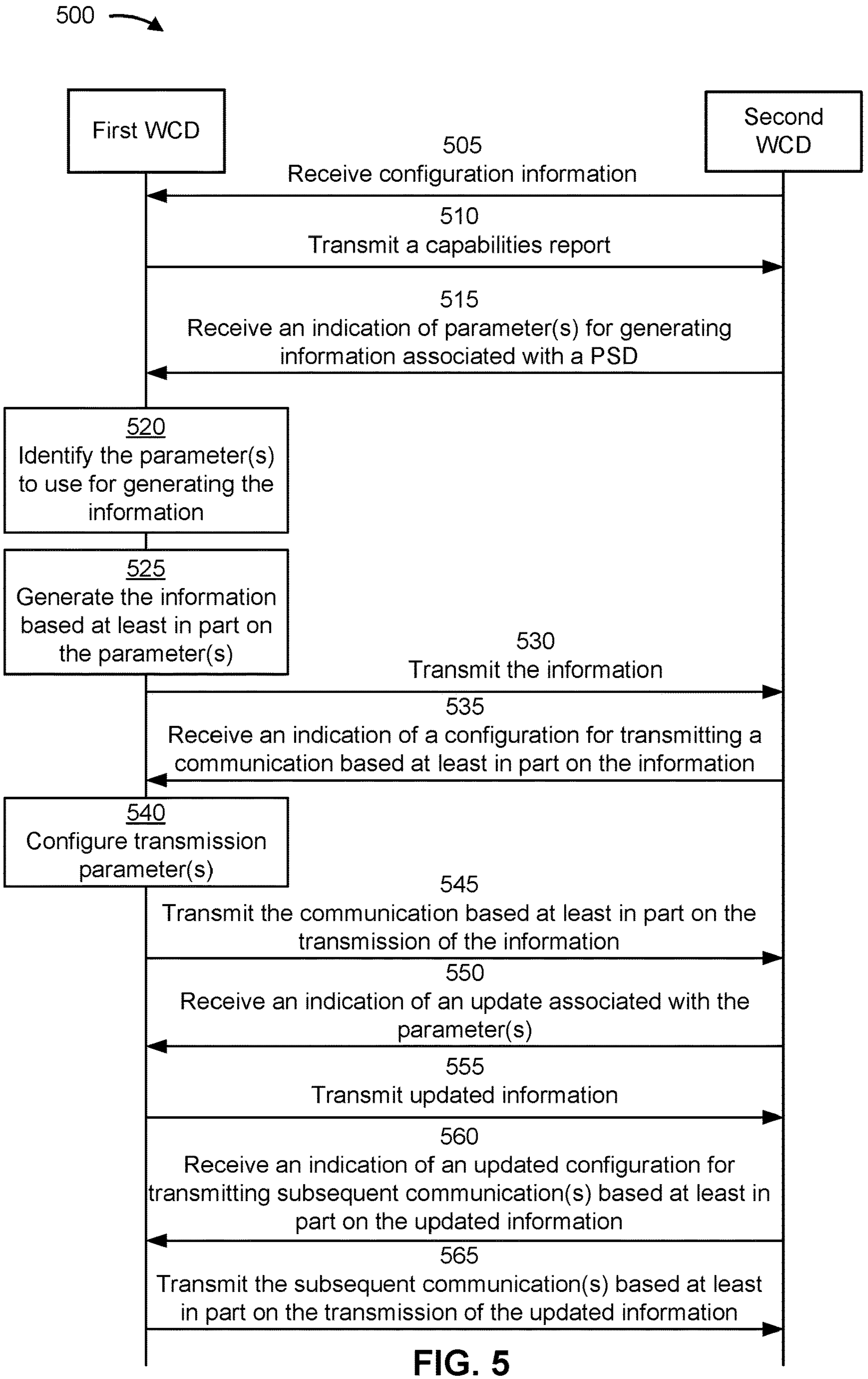
FIG. 5 is a diagram illustrating an example associated with techniques for providing information associated with a power spectral density, in accordance with the present disclosure.

FIG. 5 is a diagram illustrating an example 500 associated with techniques for providing information associated with a PSD, in accordance with the present disclosure. As shown in FIG. 5, a first WCD (e.g., an IAB node, an MT, and/or a UE 120, among other examples) may communicate with a second WCD (e.g., base station 110, an IAB node, a DU, a CU, and/or an additional UE 120, among other examples). In some aspects, the first WCD and the second WCD may be part of a wireless network (e.g., wireless network 100). The first WCD and the second WCD may have established a wireless connection prior to operations shown in FIG. 5.

As used herein, the terms "first" device and "second" device are used to distinguish one device from another device. The terms "first" and "second" are intended to be broadly construed and may not indicate an order of the devices, relative locations of the devices, or an order of performance of operations in communications between the devices. In some portions of the description herein, the first WCD of FIG. 4 may be referenced as a second WCD and the second WCD of FIG. 4 may be referenced as a first WCD. In some aspects, the first WCD and/or the second WCD may be referenced as a WCD.

As shown by reference number 505, the second WCD station may transmit, and the first WCD may receive, configuration information. In some aspects, the first WCD may receive the configuration information via one or more of RRC signaling, one or more MAC CEs, sidelink control information (SCI), DCI, an Ng interface, and/or a backhaul link, among other examples. In some aspects, the configuration information may include an indication of one or more configuration parameters (e.g., already known to the first WCD) for selection by the first WCD, or explicit configuration information for the first WCD to use to configure the first WCD, among other examples.

In some aspects, the configuration information may indicate that the first WCD is to transmit information associated with a PSD that is based at least in part on one or more parameters. In some aspects, the configuration information may indicate values of the one or more parameters and/or one or more configurations to use to determine the one or more parameters. In some aspects, the configuration information may indicate what the information associated with the PSD is to include (e.g., a PSD value and/or a PSD range, among other examples).

The first WCD may configure itself based at least in part on the configuration information. In some aspects, the first WCD may be configured to perform one or more operations described herein based at least in part on the configuration information.

As shown by reference number 510, the first WCD may transmit, and the second WCD may receive, a capabilities report. The capabilities report may indicate that the first WCD supports transmission of the information associated with the PSD. In some aspects, the capabilities report may indicate a configuration of the second WCD to determine the one or more parameters and/or to determine a value of the PSD to include in the information based at least in part on the one or more parameters.

As shown by reference number 515, the first WCD may receive, and the second WCD may transmit, an indication of one or more parameters for generating information associated with a PSD. In some aspects, the second WCD may transmit the indication of the one or more parameters via a control channel, RRC signaling, MAC layer signaling, an Ng interface, and/or via a backhaul or front haul link, among other examples.

In some aspects, the one or more parameters may include a transmission bandwidth, a guard band (e.g., between an allocation of a link between the first WCD and the second WCD and an allocation of a link between the first WCD and a receiving device), and/or a resource block allocation, among other examples. In some aspects, knowledge of the one or more parameters may support a determination of a total transmit power associated with the PSD to be indicated within the information based at least in part on an indication of the PSD. For example, a knowledge of a bandwidth parameter and a PSD value may be used to determine a new PSD value that is based at least in part on a change from the bandwidth parameter.

As shown by reference number 520, the first WCD may identify the one or more parameters to use for generating the information. In some aspects, the first WCD may identify the one or more parameters based at least in part on the indication of the parameters, as described in connection with reference number 515. For example, the first WCD may identify the one or more parameters based at least in part on an explicit indication of the parameters. Additionally, or alternatively, the first WCD may identify the one or more parameters independently from (e.g., in the absence of) the indication of the parameters and/or based at least in part on an implicit indication of the parameters.

In some aspects, the first WCD may determine the one or more parameters as, or based at least in part on, the transmission bandwidth, the guard band, and/or the resource block allocation, among other examples. In some aspects, the transmission bandwidth is based at least in part on a maximum transmission bandwidth or a configured portion of the maximum transmission bandwidth (e.g., as indicated in configuration information).

In some aspects, the one or more parameters are based at least in part on an uplink bandwidth part configuration, a bandwidth associated with at least one of the second WCD or the first WCD, a frequency-domain resource configuration (e.g., associated with hard, soft, or not available resources) of the second WCD, and/or an indication of available soft resources (e.g., resources that are available to the first WCD, if needed, but on which the first WCD is not required to transmit) in a frequency domain. In some aspects, the one or more parameters are based at least in part on a configuration associated with the transmission of the information that is associated with the PSD (e.g., using parameters associated with the transmission of the information) and/or a configuration of a transmission of a previous communication (e.g., the capabilities report, the indication of the one or more parameters, and/or another communication). In some aspects, the one or more parameters may have values that are indicated in the configuration associated with the transmission of the information, a configuration of a transmission of a previous communication, and/or a configuration for the communication.

In some aspects, the one or more parameters may be independent from a configuration of the communication or another communication. For example, the one or more parameters may be reference parameters, such that the second WCD may use known values of the one or more parameters to determine one or more additional parameters associated with the information (e.g., total transmission power requested for transmission of the communication).

As shown by reference number 525, the first WCD may generate the information based at least in part on the one or more parameters. In some aspects, the information may include one or more portions associated with different multiplexing modes, different full duplexing modes, different beams, different component carriers, different cells, different cells, and/or different signal types, among other examples.

In some aspects, the information includes a first portion of the information (e.g., a first indication, such as an indication of a PSD or a range of PSDs) that is associated with a first multiplexing mode (e.g., a simultaneous transmission mode) and a second portion of the information that is associated with a second multiplexing mode (e.g., a simultaneous transmission and reception mode). In some aspects, the information includes a portion of the information that is associated with a full duplexing mode. In some aspects, the information includes a portion of the information that is associated with a dual connectivity mode and/or different dual connectivity modes (e.g., a simultaneous transmission mode or a simultaneous transmission and reception mode, among other examples). In some aspects, the information includes a portion of the information that is associated with a carrier aggregation mode and/or different carrier aggregation modes (e.g., a simultaneous transmission mode or a simultaneous transmission and reception mode, among other examples).

In some aspects, the information includes a portion of the information that is associated with a first transmission beam, a second portion of the information that is associated with a second transmission beam, a third portion of the information that is associated with a first reception beam, and/or a fourth portion of the information that is associated with a second reception beam. In some aspects, the information may indicate information associated with different combinations of the transmission beams and the reception beams. For example, an indicated PSD may be based at least in part on spatial diversity between active beams.

In some aspects, the information includes a first portion of the information, transmitted via a first component carrier, that is associated with one or more second component carriers. In some aspects, the information includes a portion of the information, transmitted via the second component carrier, that is associated with the second component carrier (e.g., the portion of the information associated with each component carrier is transmitted using the corresponding component carrier). In some aspects, the information includes a portion of the information, transmitted via the first component carrier, that is associated with multiple component carriers (e.g., all, or a subset of all, component carriers).

In some aspects, the information includes different portions that are associated with different uplink channels (e.g., a PUCCH, a PUSCH, or a random access channel, among other examples). In some aspects, the information includes different portions that are associated with different signal types (e.g., SRSs), which may be different from portions associated with one or more uplink channels.

As shown by reference number 530, the first WCD may transmit, and the second WCD may receive, the information that is based at least in part on the one or more parameters. For example, the first WCD may transmit the information within a control channel communication, an Ng interface, and/or a backhaul or front haul link, among other examples. The information may include an indication of a PSD (e.g., a requested PSD) based at least in part on using the one or more parameters.

As shown by reference number 535, the first WCD may receive, and the second WCD may transmit, an indication of a configuration for transmitting a communication based at least in part on the information. For example, the second WCD may generate the configuration based at least in part the information by, for example, selecting a PSD that is within a range indicated within the information. The second WCD may select the PSD based at least in part on adjusting a PSD and/or a range of PSDs based at least in part on knowledge of the one or more parameters used to determine and/or calculate the information. For example, if the one or more parameters used to determine and/or calculate the information assumed a transmission bandwidth that is double a bandwidth of a resource allocation for the communication, the second WCD may adjust the PSD (e.g., to double the PSD and/or the range of PSDs indicated within the information).

In some aspects, the second WCD may generate the configuration independently from the information. For example, the second WCD may ignore a requested PSD based at least in part on the communication being a high priority communication that is to be transmitted by the first WCD with a relatively high PSD, even if the relatively high PSD may cause a communication error with another communication of the first WCD.

As shown by reference number 540, the first WCD may configure one or more transmission parameters. The first WCD may configure the one or more transmission parameters based at least in part on transmission of the information and/or based at least in part on the indication of the configuration. In some aspects, the first WCD may reduce a transmission power from an amount indicated in the configuration from the second WCD, with the reduced transmission power being within a range indicated in the information or being associated with a PSD range indicated in the information.

As shown by reference number 545, the first WCD may transmit, and the second WCD may receive, the communication based at least in part on the transmission of the information. For example, the first WCD may transmit the communication based at least in part on using one or more transmission parameters associated with the information and/or associated with the indication of the configuration described in connection with reference number 535. In some aspects, the first WCD may transmit the communication with a reduced transmission power, relative to a transmission power indicated in the configuration from the second WCD, with the reduced transmission power being within a range indicated in the information or being associated with a PSD range indicated in the information.

As shown by reference number 550, the first WCD may receive, and the second WCD may transmit, an indication of an update associated with the one or more parameters. For example, the update may update a transmission bandwidth for one or more subsequent communications, may update a guard band (e.g., between a first link and a second link of the first WCD), and/or may update a resource block allocation, among other examples.

As shown by reference number 555, the first WCD may transmit, and the second WCD may receive, updated information. In some aspects, the first WCD may transmit the updated information associated with the PSD based at least in part on the updated information. In some aspects, the first WCD may transmit the updated information based at least in part on a request from the second WCD (e.g., indicating an allocation of resources to transmit the updated information) and/or a request by the first WCD to provide the updated information to the second WCD, among other examples.

As shown by reference number 560, the first WCD may receive, and the second WCD may transmit, an indication of an updated configuration for transmitting one or more subsequent communications based at least in part on the updated information. In some aspects, the updated configuration may be based at least in part on the information previously transmitted by the first WCD. In some aspects, the updated configuration may be independent from (e.g., in the absence of) the updated information described in connection with reference number 555. For example, the second WCD may be capable of generating the updated configuration based at least in part on the information (e.g., associated with the one or more parameters) and a difference between the one or more parameters and updated one or more parameters associated with the updated configuration.

As shown by reference number 565, the first WCD may transmit, and the second WCD may receive, the one or more subsequent communications based at least in part on the transmission of the updated information.

Based at least in part on the first WCD providing information that is based at least in part on the one or more parameters, the second WCD may determine transmission parameters for the first WCD to use for a communication. The second WCD may determine one or more additional parameters (e.g., a total power limit) based at least in part on the indication of the PSD and knowledge of the one or more parameters used to determine and/or calculate the PSD. In this way, the base station may be able to reduce self-interference and/or may be able to avoid causing a transmission power for a second transmission to be reduced to below a noise floor or to be insufficient for a receiving device to receive a communication via the second transmission. This may conserve computing, communication, network, and/or power resources based at least in part on reducing communication errors and/or reducing detection and/or correction of the communication errors.

As indicated above, FIG. 5 is provided as an example. Other examples may differ from what is described with regard to FIG. 5.

Figure 6:
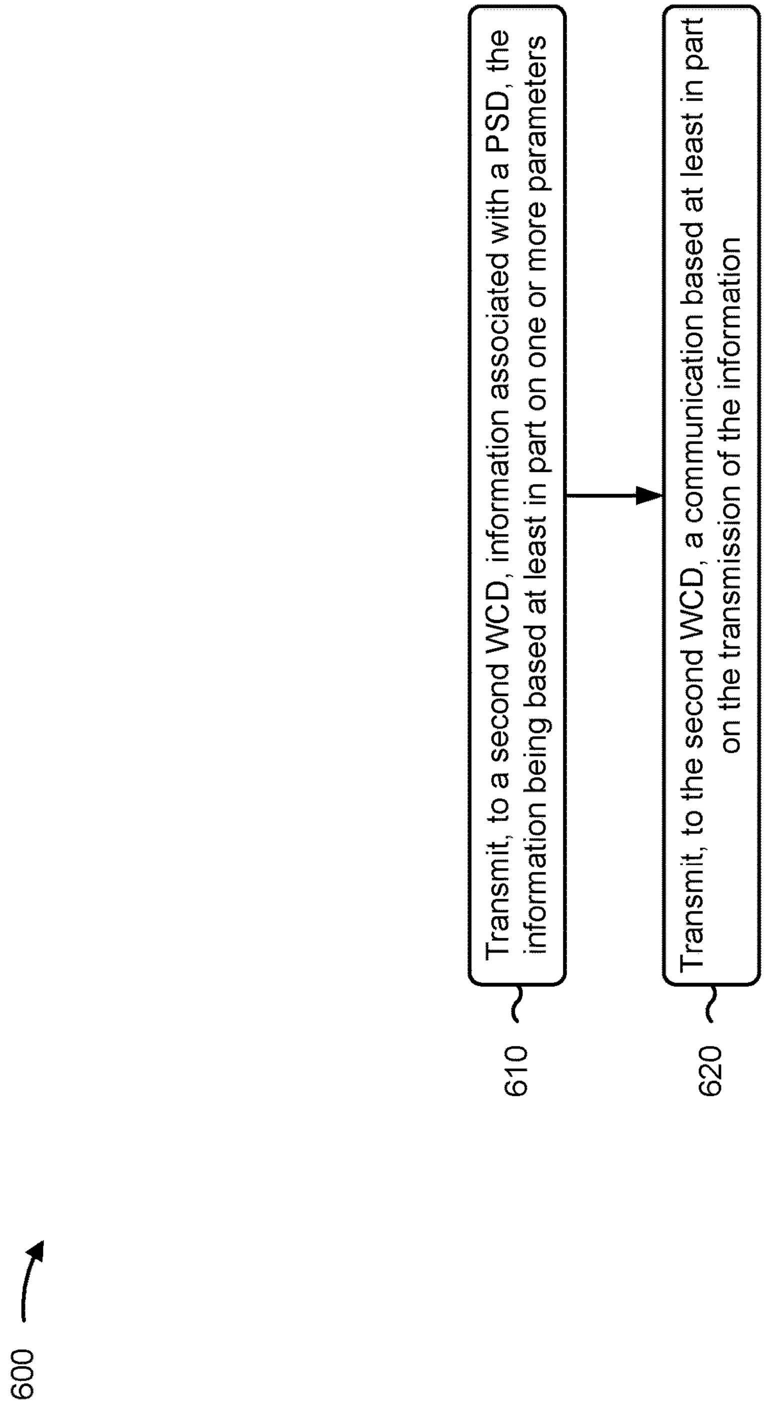
FIGS. 6 and 7 are diagrams illustrating example processes associated with techniques for providing information associated with a power spectral density, in accordance with the present disclosure.

FIG. 6 is a diagram illustrating an example process 600 performed, for example, by a first WCD, in accordance with the present disclosure. Example process 600 is an example where the first WCD (e.g., an IAB node, a child node, an MT, or a UE) performs operations associated with providing information associated with a PSD.

As shown in FIG. 6, in some aspects, process 600 may include transmitting, to a second WCD, information associated with a PSD, the information being based at least in part on one or more parameters (block 610). For example, the first WCD (e.g., using communication manager 140 or 150 and/or transmission component 804, depicted in FIG. 8) may transmit, to a second WCD, information associated with a PSD, the information being based at least in part on one or more parameters, as described above.

As further shown in FIG. 6, in some aspects, process 600 may include transmitting, to the second WCD, a communication based at least in part on the transmission of the information (block 620). For example, the first WCD (e.g., using communication manager 140 or 150 and/or transmission component 804, depicted in FIG. 8) may transmit, to the second WCD, a communication based at least in part on the transmission of the information, as described above.

Process 600 may include additional aspects, such as any single aspect or any combination of aspects described below and/or in connection with one or more other processes described elsewhere herein.

In a first aspect, the one or more parameters comprise one or more of a transmission bandwidth, a guard band, or a resource block allocation.

In a second aspect, alone or in combination with the first aspect, the one or more parameters comprise the transmission bandwidth, and the transmission bandwidth is based at least in part on a maximum transmission bandwidth.

In a third aspect, alone or in combination with one or more of the first and second aspects, the one or more parameters are based at least in part on one or more of an uplink bandwidth part configuration, a bandwidth associated with at least one of the second WCD or the first WCD, a frequency-domain resource configuration (e.g., associated with hard, soft, or not available resources) of the second WCD, or an indication of available soft resources in a frequency domain.

In a fourth aspect, alone or in combination with one or more of the first through third aspects, the one or more parameters are based at least in part on one or more of one or more parameters associated with the transmission of the information associated with the PSD, or one or more parameters associated with a transmission of a previous communication.

In a fifth aspect, alone or in combination with one or more of the first through fourth aspects, at least one of the one or more parameters is not configured for the communication.

In a sixth aspect, alone or in combination with one or more of the first through fifth aspects, the one or more parameters are based at least in part on one or more of an explicit indication, from the second WCD, of the one or more parameters, or an implicit indication, from the second WCD, that is based at least in part on one or more configurations for the communication.

In a seventh aspect, alone or in combination with one or more of the first through sixth aspects, process 600 includes receiving an indication of an update associated with the one or more parameters, and transmitting updated information associated with the PSD based at least in part on the updated information.

In an eighth aspect, alone or in combination with one or more of the first through seventh aspects, process 600 includes receiving an indication of an updated configuration associated with the one or more parameters, and receiving a configuration for transmitting one or more subsequent communications based at least in part on the updated configuration and the information previously transmitted by the first WCD.

In a ninth aspect, alone or in combination with one or more of the first through eighth aspects, the information comprises one or more of a first portion of the information that is associated with a first multiplexing mode, a second portion of the information that is associated with a second multiplexing mode, a third portion of the information that is associated with full duplexing mode, a fourth portion of the information that is associated with a dual connectivity mode, or a fifth portion of the information that is associated with a carrier aggregation mode.

In a tenth aspect, alone or in combination with one or more of the first through ninth aspects, the information comprises one or more of a first portion of the information that is associated with a first transmission beam, a second portion of the information that is associated with a second transmission beam, a third portion of the information that is associated with a first reception beam, or a fourth portion of the information that is associated with a second reception beam.

In an eleventh aspect, alone or in combination with one or more of the first through tenth aspects, the information comprises one or more of a first portion of the information, transmitted via a first component carrier, that is associated with a second component carrier; a second portion of the information, transmitted via the second component carrier, that is associated with the second component carrier; or a third portion of the information, transmitted via the first component carrier, that is associated with multiple component carriers.

In a twelfth aspect, alone or in combination with one or more of the first through eleventh aspects, the information comprises one or more of a first portion of the information that is associated with a first uplink channel or signal type, or a second portion of the information that is associated with a second uplink channel or signal type.

In a thirteenth aspect, alone or in combination with one or more of the first through twelfth aspects, process 600 includes receiving, from the second WCD and based at least in part on the information, an indication of a transmission configuration for the communication.

In a fourteenth aspect, alone or in combination with one or more of the first through thirteenth aspects, process 600 includes configuring one or more transmission parameters for the communication based at least in part on the transmission of the information.

In a fifteenth aspect, alone or in combination with one or more of the first through fourteenth aspects, the information comprises a range of the PSDs requested for the transmission of the communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
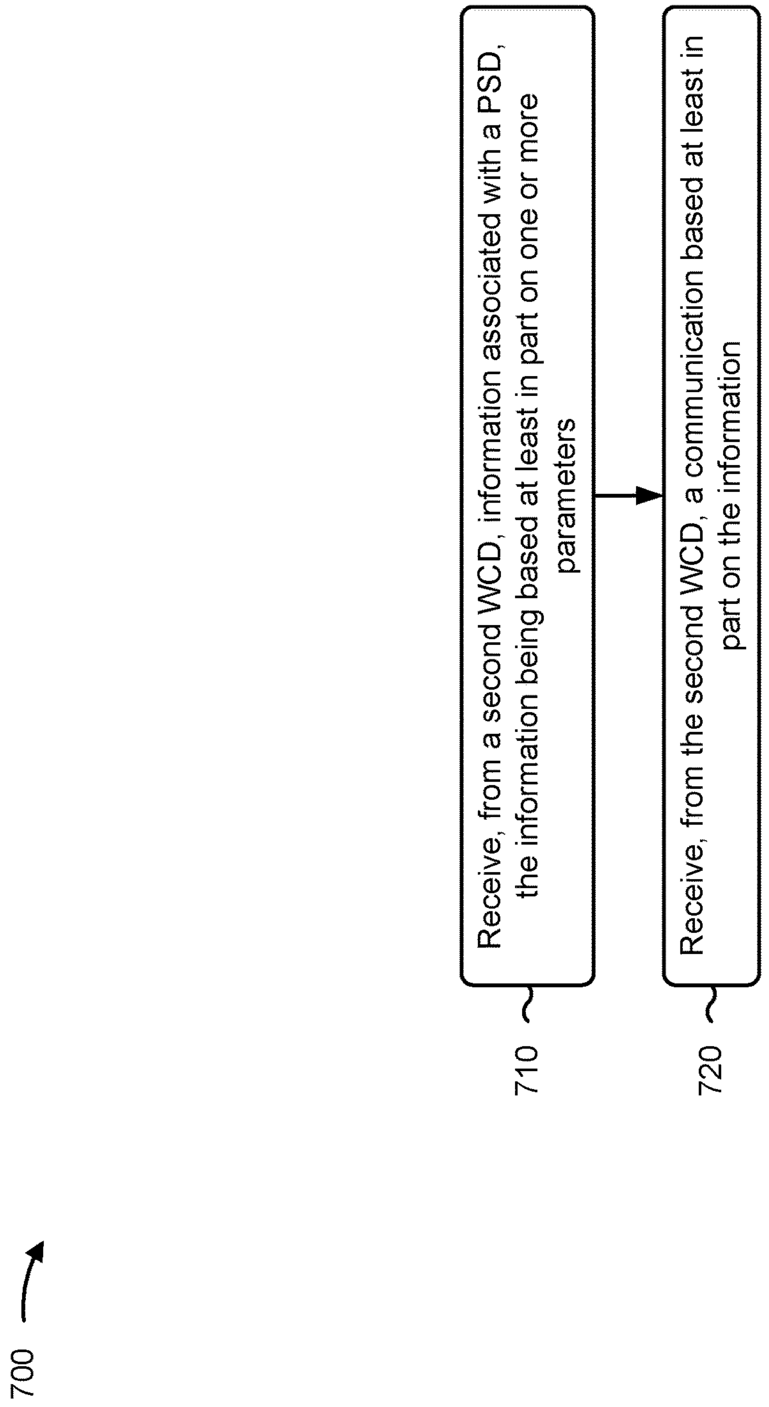

FIG. 7 is a diagram illustrating an example process 700 performed, for example, by a first WCD, in accordance with the present disclosure. Example process 700 is an example where the first WCD (e.g., a base station, a DU, a parent node, and/or another UE) (e.g., in a sidelink connection) performs operations associated with techniques for providing information associated with a PSD.

As shown in FIG. 7, in some aspects, process 700 may include receiving, from a second WCD, information associated with a PSD, the information being based at least in part on one or more parameters (block 710). For example, the first WCD (e.g., using communication manager 140 or 150 and/or reception component 902, depicted in FIG. 9) may receive, from a second WCD, information associated with a PSD, the information being based at least in part on one or more parameters, as described above.

As further shown in FIG. 7, in some aspects, process 700 may include receiving, from the second WCD, a communication based at least in part on the information (block 720). For example, the first WCD (e.g., using communication manager 140 or 150 and/or reception component 902, depicted in FIG. 9) may receive, from the second WCD, a communication based at least in part on the information, as described above.

Process 700 may include additional aspects, such as any single aspect or any combination of aspects described below and/or in connection with one or more other processes described elsewhere herein.

In a first aspect, the one or more parameters comprise one or more of a transmission bandwidth, a reference guard band, or a resource block allocation.

In a second aspect, alone or in combination with the first aspect, the one or more parameters comprise the transmission bandwidth, and the transmission bandwidth is based at least in part on a maximum transmission bandwidth.

In a third aspect, alone or in combination with one or more of the first and second aspects, the one or more parameters are based at least in part on one or more of an uplink bandwidth part configuration, a bandwidth associated with the first WCD, a frequency-domain resource configuration (e.g., associated with hard, soft, or not available resources) of the first WCD, or an indication of available soft resources in a frequency domain.

In a fourth aspect, alone or in combination with one or more of the first through third aspects, the one or more parameters are based at least in part on one or more of one or more parameters associated with a transmission of the information associated with the PSD, or one or more parameters associated with a transmission of a previous communication.

In a fifth aspect, alone or in combination with one or more of the first through fourth aspects, at least one of the one or more parameters is not configured for the communication.

In a sixth aspect, alone or in combination with one or more of the first through fifth aspects, the one or more parameters are based at least in part on one or more of an explicit indication, from the first WCD, of the one or more parameters, or an implicit indication, from the first WCD, that is based at least in part on one or more configurations for the communication.

In a seventh aspect, alone or in combination with one or more of the first through sixth aspects, process 700 includes transmitting an indication of an update associated with the one or more parameters, and receiving updated information associated with the PSD based at least in part on the updated information.

In an eighth aspect, alone or in combination with one or more of the first through seventh aspects, process 700 includes transmitting an indication of an updated configuration associated with the one or more parameters, and transmitting a configuration for transmission of one or more subsequent communications based at least in part on the updated configuration and the information previously received from the second WCD.

In a ninth aspect, alone or in combination with one or more of the first through eighth aspects, the information comprises one or more of a first portion of the information that is associated with a first multiplexing mode of the second WCD, a second portion of the information that is associated with a second multiplexing mode of the second WCD, a third portion of the information that is associated with full duplexing mode of the second WCD, a fourth portion of the information that is associated with a dual connectivity mode of the second WCD, or a fifth portion of the information that is associated with a carrier aggregation mode of the second WCD.

In a tenth aspect, alone or in combination with one or more of the first through ninth aspects, the information comprises one or more of a first portion of the information that is associated with a first transmission beam of the second WCD, a second portion of the information that is associated with a second transmission beam of the second WCD, a third portion of the information that is associated with a first reception beam of the second WCD, or a fourth portion of the information that is associated with a second reception beam of the second WCD.

In an eleventh aspect, alone or in combination with one or more of the first through tenth aspects, the information comprises one or more of a first portion of the information, transmitted via a first component carrier, that is associated with a second component carrier of the second WCD; a second portion of the information, transmitted via the second component carrier, that is associated with the second component carrier of the second WCD; or a third portion of the information, transmitted via the first component carrier, that is associated with a set of multiple component carriers of the second WCD.

In a twelfth aspect, alone or in combination with one or more of the first through eleventh aspects, the information comprises one or more of a first portion of the information that is associated with a first uplink channel or signal type of the second WCD, or a second portion of the information that is associated with a second uplink channel or signal type of the second WCD.

In a thirteenth aspect, alone or in combination with one or more of the first through twelfth aspects, process 700 includes transmitting, to the second WCD and based at least in part on the information, an indication of a transmission configuration for the communication.

In a fourteenth aspect, alone or in combination with one or more of the first through thirteenth aspects, the information comprises a range of the PSDs requested for the transmission of the communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
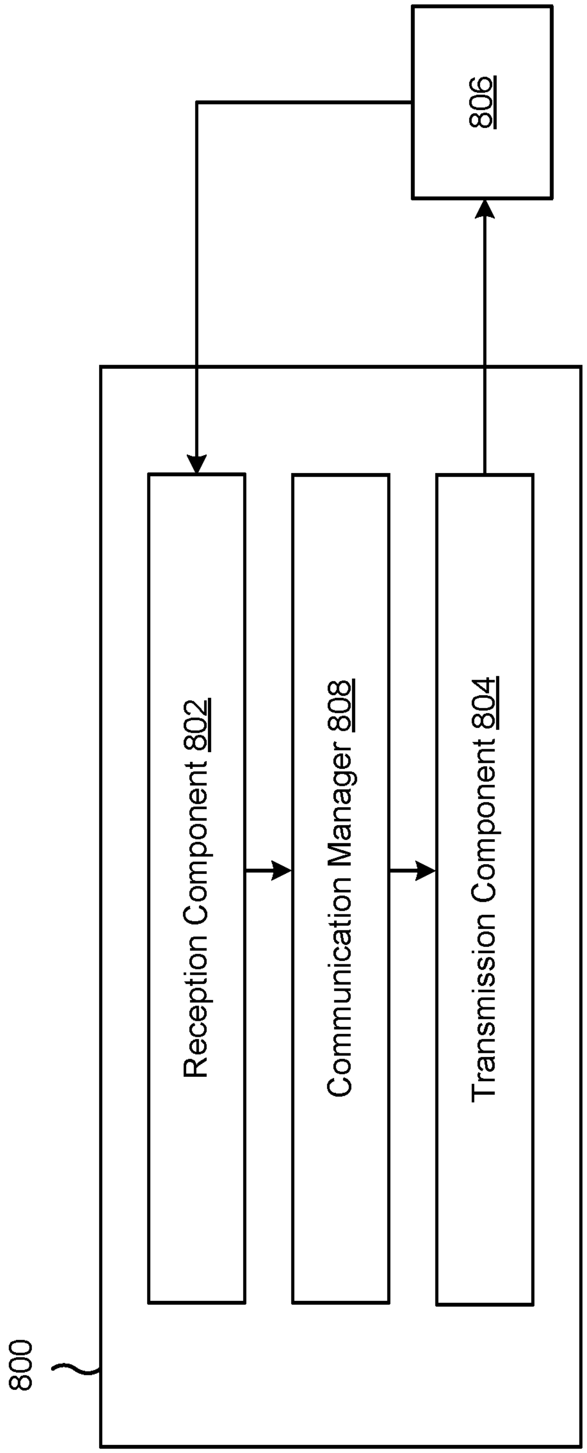
FIGS. 8 and 9 are diagrams of example apparatuses for wireless communication, in accordance with the present disclosure.

FIG. 8 is a diagram of an example apparatus 800 for wireless communication. The apparatus 800 may be a first WCD, or a first WCD may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another WCD) using the reception component 802 and the transmission component 804. As further shown, the apparatus 800 may include a communication manager 808 (e.g., the communication manager 140 or 150).

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the first WCD described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the first WCD described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the first WCD described in connection with FIG. 2. In some aspects, the transmission component 804 may be co-located with the reception component 802 in a transceiver.

The transmission component 804 may transmit, to a second WCD, information associated with a PSD, the information being based at least in part on one or more parameters. The transmission component 804 may transmit, to the second WCD, a communication based at least in part on the transmission of the information.

The reception component 802 may receive an indication of an update associated with the one or more parameters.

The transmission component 804 may transmit updated information associated with the PSD based at least in part on the updated information.

The reception component 802 may receive an indication of an updated configuration associated with the one or more parameters.

The reception component 802 may receive a configuration for transmitting one or more subsequent communications based at least in part on the updated configuration and the information previously transmitted by the first WCD.

The reception component 802 may receive, from the second WCD and based at least in part on the information, an indication of a transmission configuration for the communication.

The communication manager 808 may configure one or more transmission parameters for the communication based at least in part on the transmission of the information.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
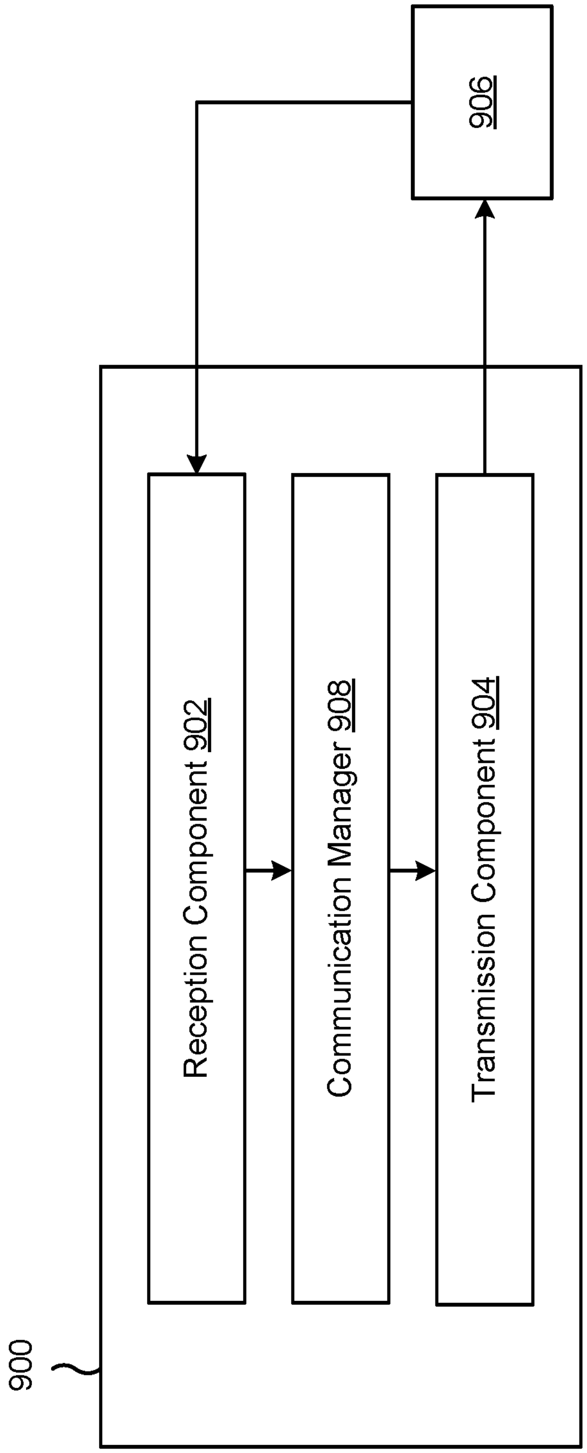

FIG. 9 is a diagram of an example apparatus 900 for wireless communication. The apparatus 900 may be a first WCD, or a first WCD may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another WCD) using the reception component 902 and the transmission component 904. As further shown, the apparatus 900 may include a communication manager 908 (e.g., the communication manager 140 or 150).

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the first WCD described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the first WCD described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the first WCD described in connection with FIG. 2. In some aspects, the transmission component 904 may be co-located with the reception component 902 in a transceiver.

The reception component 902 may receive, from a second WCD, information associated with a PSD, the information being based at least in part on one or more parameters. The reception component 902 may receive, from the second WCD, a communication based at least in part on the information.

The transmission component 904 may transmit an indication of an update associated with the one or more parameters.

The reception component 902 may receive updated information associated with the PSD based at least in part on the updated information.

The transmission component 904 may transmit an indication of an updated configuration associated with the one or more parameters.

The transmission component 904 may transmit a configuration for transmission of one or more subsequent communications based at least in part on the updated configuration and the information previously received from the second WCD.

The transmission component 904 may transmit, to the second WCD and based at least in part on the information, an indication of a transmission configuration for the communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first wireless communication device (WCD), comprising: transmitting, to a second WCD, information associated with a power spectral density (PSD), the information being based at least in part on one or more parameters; and transmitting, to the second WCD, a communication based at least in part on the transmission of the information.

Aspect 2: The method of Aspect 1, wherein the one or more parameters comprise one or more of: a transmission bandwidth, a guard band, or a resource block allocation.

Aspect 3: The method of Aspect 2, wherein the one or more parameters comprise the transmission bandwidth, and wherein the transmission bandwidth is based at least in part on a maximum transmission bandwidth.

Aspect 4: The method of any of Aspects 1-3, wherein the one or more parameters are based at least in part on one or more of: an uplink bandwidth part configuration, a bandwidth associated with at least one of the second WCD or the first WCD, a frequency-domain resource configuration of at least one of the second WCD or the first WCD, or an indication of available soft resources in a frequency domain.

Aspect 5: The method of any of Aspects 1-4, wherein the one or more parameters are based at least in part on one or more of: one or more parameters associated with the transmission of the information associated with the PSD, or one or more parameters associated with a transmission of a previous communication.

Aspect 6: The method of any of Aspects 1-5, wherein at least one of the one or more parameters are not configured for the communication.

Aspect 7: The method of any of Aspects 1-6, wherein the one or more parameters are based at least in part on one or more of: an explicit indication, from the second WCD, of the one or more parameters, or an implicit indication, from the second WCD, that is based at least in part on one or more configurations for the communication.

Aspect 8: The method of any of Aspects 1-7, further comprising: receiving an indication of an update associated with the one or more parameters; and transmitting updated information associated with the PSD based at least in part on the updated information.

Aspect 9: The method of any of Aspects 1-8, further comprising: receiving an indication of an updated configuration associated with the one or more parameters; and receiving a configuration for transmitting one or more subsequent communications based at least in part on the updated configuration and the information previously transmitted by the first WCD.

Aspect 10: The method of any of Aspects 1-9, wherein the information comprises one or more of: a first portion of the information that is associated with a first multiplexing mode, a second portion of the information that is associated with a second multiplexing mode, a third portion of the information that is associated with full duplexing mode, a fourth portion of the information that is associated with a dual connectivity mode, or a fifth portion of the information that is associated with a carrier aggregation mode.

Aspect 11: The method of any of Aspects 1-10, wherein the information comprises one or more of: a first portion of the information that is associated with a first transmission beam, a second portion of the information that is associated with a second transmission beam, a third portion of the information that is associated with a first reception beam, or a fourth portion of the information that is associated with a second reception beam.

Aspect 12: The method of any of Aspects 1-11, wherein the information comprises one or more of: a first portion of the information, transmitted via a first component carrier, that is associated with a second component carrier, a second portion of the information, transmitted via the second component carrier, that is associated with the second component carrier, or a third portion of the information, transmitted via the first component carrier, that is associated with multiple component carriers.

Aspect 13: The method of any of Aspects 1-12, wherein the information comprises one or more of: a first portion of the information that is associated with a first uplink channel or signal type, or a second portion of the information that is associated with a second uplink channel or signal type.

Aspect 14: The method of any of Aspects 1-13, further comprising: receiving, from the second WCD and based at least in part on the information, an indication of a transmission configuration for the communication.

Aspect 15: The method of any of Aspects 1-14, further comprising: configuring one or more transmission parameters for the communication based at least in part on the transmission of the information.

Aspect 16: The method of any of Aspects 1-15, wherein the information comprises a range of the PSD requested for the transmission of the communication.

Aspect 17: A method of wireless communication performed by a first wireless communication device (WCD), comprising: receiving, from a second WCD, information associated with a power spectral density (PSD), the information being based at least in part on one or more parameters; and receiving, from the second WCD, a communication based at least in part on the information.

Aspect 18: The method of Aspect 17, wherein the one or more parameters comprise one or more of: a transmission bandwidth, a reference guard band, or a resource block allocation.

Aspect 19: The method of Aspect 18, wherein the one or more parameters comprise the transmission bandwidth, and wherein the transmission bandwidth is based at least in part on a maximum transmission bandwidth.

Aspect 20: The method of any of Aspects 17-19, wherein the one or more parameters are based at least in part on one or more of: an uplink bandwidth part configuration, a bandwidth associated with the first WCD, a frequency-domain resource configuration of the first WCD, or an indication of available soft resources in a frequency domain.

Aspect 21: The method of any of Aspects 17-20, wherein the one or more parameters are based at least in part on one or more of: one or more parameters associated with a transmission of the information associated with the PSD, or one or more parameters associated with a transmission of a previous communication.

Aspect 22: The method of any of Aspects 17-21, wherein at least one of the one or more parameters are not configured for the communication.

Aspect 23: The method of any of Aspects 17-22, wherein the one or more parameters are based at least in part on one or more of: an explicit indication, from the first WCD, of the one or more parameters, or an implicit indication, from the first WCD, that is based at least in part on one or more configurations for the communication.

Aspect 24: The method of any of Aspects 17-23, further comprising: transmitting an indication of an update associated with the one or more parameters; and receiving updated information associated with the PSD based at least in part on the updated information.

Aspect 25: The method of any of Aspects 17-24, further comprising: transmitting an indication of an updated configuration associated with the one or more parameters; and transmitting a configuration for transmission of one or more subsequent communications based at least in part on the updated configuration and the information previously received from the second WCD.

Aspect 26: The method of any of Aspects 17-25, wherein the information comprises one or more of: a first portion of the information that is associated with a first multiplexing mode of the second WCD, a second portion of the information that is associated with a second multiplexing mode of the second WCD, a third portion of the information that is associated with full duplexing mode of the second WCD, a fourth portion of the information that is associated with a dual connectivity mode of the second WCD, or a fifth portion of the information that is associated with a carrier aggregation mode of the second WCD.

Aspect 27: The method of any of Aspects 17-26, wherein the information comprises one or more of: a first portion of the information that is associated with a first transmission beam of the second WCD, a second portion of the information that is associated with a second transmission beam of the second WCD, a third portion of the information that is associated with a first reception beam of the second WCD, or a fourth portion of the information that is associated with a second reception beam of the second WCD.

Aspect 28: The method of any of Aspects 17-27, wherein the information comprises one or more of: a first portion of the information, transmitted via a first component carrier, that is associated with a second component carrier of the second WCD, a second portion of the information, transmitted via the second component carrier, that is associated with the second component carrier of the second WCD, or a third portion of the information, transmitted via the first component carrier, that is associated with a set of multiple component carriers of the second WCD.

Aspect 29: The method of any of Aspects 17-28, wherein the information comprises one or more of: a first portion of the information that is associated with a first uplink channel or signal type of the second WCD, or a second portion of the information that is associated with a second uplink channel or signal type of the second WCD.

Aspect 30: The method of any of Aspects 17-29, further comprising: transmitting, to the second WCD and based at least in part on the information, an indication of a transmission configuration for the communication.

Aspect 31: The method of any of Aspects 17-30, wherein the information comprises a range of the PSD requested for the transmission of the communication.

Aspect 32: An apparatus for wireless communication at a device, comprising a processor; memory coupled with the processor; and instructions stored in the memory and executable by the processor to cause the apparatus to perform the method of one or more of Aspects 1-31.

Aspect 33: A device for wireless communication, comprising a memory and one or more processors coupled to the memory, the one or more processors configured to perform the method of one or more of Aspects 1-31.

Aspect 34: An apparatus for wireless communication, comprising at least one means for performing the method of one or more of Aspects 1-31.

Aspect 35: A non-transitory computer-readable medium storing code for wireless communication, the code comprising instructions executable by a processor to perform the method of one or more of Aspects 1-31.

Aspect 36: A non-transitory computer-readable medium storing a set of instructions for wireless communication, the set of instructions comprising one or more instructions that, when executed by one or more processors of a device, cause the device to perform the method of one or more of Aspects 1-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first wireless communication device (WCD), comprising:

transmitting, to a second WCD and via a medium access control (MAC) control element (CE), information indicating a power spectral density (PSD) range for transmission of a communication from the first WCD; and transmitting, to the second WCD, the communication, in accordance with the PSD range.

2. The method of claim 1, wherein the information indicates a first set of information for a first PSD range or a second set of information for a second PSD range, wherein the first PSD range is associated with a first multiplexing mode, and wherein the second PSD range is associated with a second multiplexing mode.

3. The method of claim 2, wherein the first multiplexing mode or the second multiplexing mode is associated with one or more of:

frequency division multiplexing (FDM) of the communication with an additional communication, FDM of the communication with transmission of a downlink communication by the first WCD, or FDM of the communication with reception of an uplink communication by the first WCD.

4. The method of claim 2, wherein the information includes an indication of a request to adjust timing of the communication based at least in part on the first multiplexing mode.

5. The method of claim 1, wherein the information indicates a first set of information for a first PSD range or a second set of information for a second PSD range, wherein the first PSD range is associated with a first uplink beam, and wherein the second PSD range is associated with a second uplink beam.

6. The method of claim 1, wherein the information indicates a first set of information for a first PSD range or a second set of information for a second PSD range, wherein the first PSD range is associated with a first component carrier, and wherein the second PSD range is associated with a second component carrier.

7. The method of claim 1, wherein the information indicates a first set of information for a first PSD range or a second set of information for a second PSD range, wherein the first PSD range is associated with a first set of time resources, and wherein the second PSD range is associated with a second set of time resources.

8. The method of claim 1, wherein the information indicates one or more of:

a set of one or more recommended beams for the communication, or a set of one or more beams not recommended for the communication.

9. The method of claim 1, further comprising: receiving an indication of one or more of:

a set of one or more recommended beams for communication with a child node, or a set of one or more beams not recommended for communication with a child node.

10. The method of claim 1, wherein the information indicates one or more of:

an indication of a desired guard band for the communication, or an indication that the communication is required to be transmitted with frequency division multiplexing.

11. A first wireless communication device (WCD) for wireless communication, comprising:

one or more memories; and one or more processors, coupled to the one or more memories, configured to:

transmit, to a second WCD and via a medium access control (MAC) control element (CE), information indicating a power spectral density (PSD) range for transmission of a communication from the first WCD; and transmit, to the second WCD, the communication, in accordance with the PSD range.

12. The first WCD of claim 11, wherein the information indicates a first set of information for a first PSD range or a second set of information for a second PSD range, wherein the first PSD range is associated with a first multiplexing mode, and wherein the second PSD range is associated with a second multiplexing mode.

13. The first WCD of claim 12, wherein the first multiplexing mode or the second multiplexing mode is associated with one or more of:

frequency division multiplexing (FDM) of the communication with an additional communication, FDM of the communication with transmission of a downlink communication by the first WCD, or FDM of the communication with reception of an uplink communication by the first WCD.

14. The first WCD of claim 12, wherein the information includes an indication of a request to adjust timing of the communication based at least in part on the first multiplexing mode.

15. The first WCD of claim 11, wherein the information indicates a first set of information for a first PSD range or a second set of information for a second PSD range, wherein the first PSD range is associated with a first uplink beam, and wherein the second PSD range is associated with a second uplink beam.

16. The first WCD of claim 11, wherein the information indicates a first set of information for a first PSD range or a second set of information for a second PSD range, wherein the first PSD range is associated with a first component carrier, and wherein the second PSD range is associated with a second component carrier.

17. The first WCD of claim 11, wherein the information indicates a first set of information for a first PSD range or a second set of information for a second PSD range, wherein the first PSD range is associated with a first set of time resources, and wherein the second PSD range is associated with a second set of time resources.

18. The first WCD of claim 11, wherein the information indicates one or more of:

a set of one or more recommended beams for the communication, or a set of one or more beams not recommended for the communication.

19. The first WCD of claim 11, wherein the one or more processors are further configured to:

receive an indication of one or more of:

a set of one or more recommended beams for communication with a child node, or a set of one or more beams not recommended for communication with a child node.

20. The first WCD of claim 11, wherein the information indicates one or more of:

an indication of a desired guard band for the communication, or an indication that the communication is required to be transmitted with frequency division multiplexing.

21. A non-transitory computer-readable medium storing a set of instructions for wireless communication, the set of instructions comprising:

one or more instructions that, when executed by one or more processors of a first wireless communication device (WCD), cause the first WCD to:

transmit, to a second WCD and via a medium access control (MAC) control element (CE), information indicating a power spectral density (PSD) range for transmission of a communication from the first WCD; and transmit, to the second WCD, the communication, in accordance with the PSD range.

22. The non-transitory computer-readable medium of claim 21, wherein the information indicates a first set of information for a first PSD range and a second PSD range, wherein the first PSD range is associated with a first multiplexing mode, and wherein the second PSD range is associated with a second multiplexing mode.

23. The non-transitory computer-readable medium of claim 22, wherein the first multiplexing mode or the second multiplexing mode is associated with one or more of:

frequency division multiplexing (FDM) of the communication with an additional communication, FDM of the communication with transmission of a downlink communication by the first WCD, or FDM of the communication with reception of an uplink communication by the first WCD.

24. The non-transitory computer-readable medium of claim 21, wherein the information indicates a first set of information for a first PSD range or a second set of information for a second PSD range, wherein the first PSD range is associated with a first uplink beam, and wherein the second PSD range is associated with a second uplink beam.

25. An apparatus for wireless communication, comprising:

means for transmitting, to a second WCD and via a medium access control (MAC) control element (CE), information indicating a power spectral density (PSD) range for transmission of a communication from the apparatus; and means for transmitting, to the second WCD, the communication, in accordance with the PSD range.

26. The apparatus of claim 25, wherein the information indicates a first set of information for a first PSD range and a second PSD range, wherein the first PSD range is associated with a first multiplexing mode, and wherein the second PSD range is associated with a second multiplexing mode.

27. The apparatus of claim 26, wherein the first multiplexing mode or the second multiplexing mode is associated with one or more of:

frequency division multiplexing (FDM) of the communication with an additional communication, FDM of the communication with transmission of a downlink communication by the apparatus, or FDM of the communication with reception of an uplink communication by the apparatus.

28. The apparatus of claim 25, wherein the information indicates a first set of information for a first PSD range or a second set of information for a second PSD range, wherein the first PSD range is associated with a first uplink beam, and wherein the second PSD range is associated with a second uplink beam.

29. The method of claim 1, wherein the first WCD is an integrated access and backhaul (IAB) node, and wherein the second WCD is an IAB node.

30. The method of claim 8, wherein the set of the one or more recommended beams for the communication comprises a set of uplink beams.

* * * * *